Feb. 23, 1954 J. P. ECKERT, JR., ET AL 2,670,459

ACOUSTIC DELAY DEVICE

Original Filed Oct. 31, 1947 3 Sheets-Sheet 1

INVENTORS:
JOHN W. MAUCHLY
JOHN PRESPER ECKERT JR.

George V. Eltgroth

ATTORNEY

Feb. 23, 1954 J. P. ECKERT, JR., ET AL 2,670,459

ACOUSTIC DELAY DEVICE

Original Filed Oct. 31, 1947 3 Sheets-Sheet 2

INVENTORS:
JOHN W. MAUCHLY
JOHN PRESPER ECKERT JR.
George V. Eltgroth
ATTORNEY

ACOUSTIC DELAY DEVICE

Original Filed Oct. 31, 1947 3 Sheets-Sheet 3

INVENTORS:
JOHN W. MAUCHLY
JOHN PRESPER ECKERT JR.

George V. Eltgroth
ATTORNEY

Patented Feb. 23, 1954

2,670,459

UNITED STATES PATENT OFFICE 2,670,459

ACOUSTIC DELAY DEVICE

John Presper Eckert, Jr., Gladwyne, and John W. Mauchly, Ambler, Pa., assignors to Eckert-Mauchly Computer Corporation, Philadelphia, Pa., a corporation of Pennsylvania Original application October 31, 1947, Serial No. 783,328. Divided and this application April 28, 1951, Serial No. 223,514

6 Claims. (Cl. 333—30)

Figure 1:
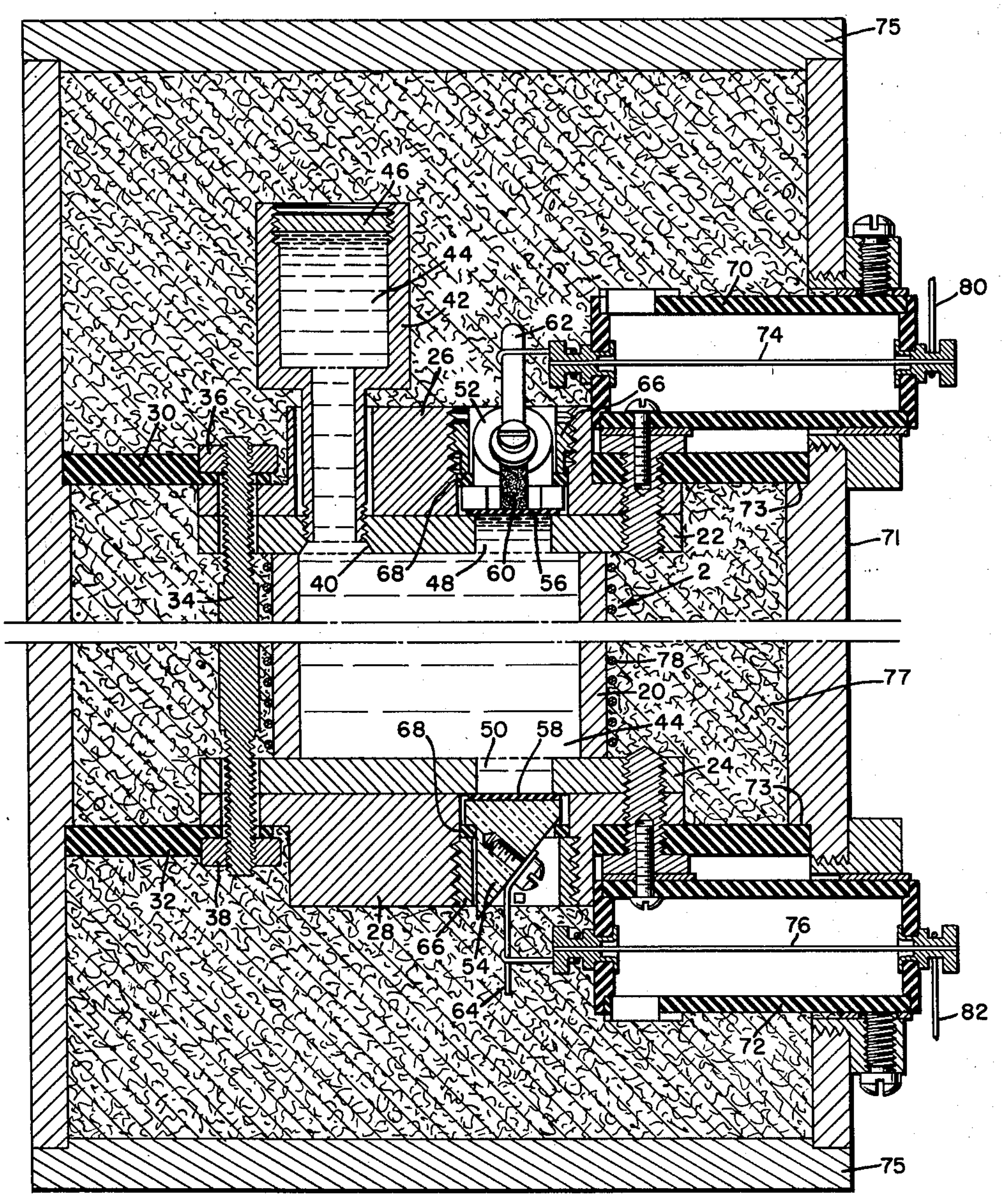

This invention relates to a memory device and various elements thereof, the memory device being of a type into which information may be introduced electrically and from which information may be secured electrically.

This application is a division of our application Serial Number 783,328 filed October 31st, 1947, now Patent No. 2,629,827, dated February 24, 1953.

Memory devices of the type just indicated are required in a large variety of means used for carrying out logical procedures wherein they have the function of receiving information, holding it, and transmitting it when and if required. A wide variety of devices have been used for this purpose. Mechanical memories as used in computing machines quite generally comprise series of wheels, the angular positions of which determine the information which is stored. Electrical relays have also been used for this purpose, information being coded to correspond to open or shut conditions of various contacts. Vacuum and gas tubes have also been used for this purpose, the information here also being coded in terms of conductive and nonconductive conditions of the tubes or in terms of ranges of potentials or the like.

The various memory systems just described have deficiencies which become particularly evident when the storing of a large quantity of information is involved. All of these systems are mechanically complicated by reason of the multiplicity of their elements required when any large amount of information is to be stored. All of them also involve the consumption of large amounts of power in their operation. Except for those systems involving vacuum tubes, they are also quite slow in operation when their speed is compared with that attainable by the use of vacuum tubes operating through the medium of electrical pulses.

One object of the present invention is the provision of a memory device operating on a principle quite different from any of the above. In accordance with the present system information is stored in a coded sequence of pulses, using that term in a quite broad sense, which pulses are caused to circulate through a path, after being introduced electrically into the input terminal of the path, travelling along the path for a particular delay or transit time and then being taken from the path electrically. What has been just referred to may be made clear by reference to several embodiments of the invention which will be described in detail hereafter. In one preferred embodiment, for example, the electrical input pulses are caused to produce in a liquid or solid medium acoustic pulses which are propagated through the medium to a terminal thereof, the transit time being such that at any instant in the medium there will exist a train of pulses which, by their nature and sequence, are representative of stored information. At the end of the transmission path, the acoustic pulses are retranslated into electrical pulses. The output signals may be returned to the input to produce through the acoustic pulse transmitting medium a continuous recirculation of a pattern of acoustic pulses characteristic of the stored information.

Accordingly, one of the principal objects of the invention is to provide new and improved information storage means.

Another object of the invention is to provide new and improved signal delay apparatus.

Yet another object of the invention is to provide new and improved acoustic delay means.

A further object of the invention is to provide new and improved impedance matched apparatus transforming electrical signals to acoustic signals and acoustic signals to electrical signals with minimum distortion or signal loss.

Still a furthear object of the invention is to provide new and improved apparatus for acoustically transmitting signals in a plurality of channels within the same medium with negligent cross-talk effect.

Yet a further object of the invention is to provide new and improved acoustic delay apparatus having a plurality of signal output terminals along its delay path.

Another object of the invention is to provide a new and improved acoustic delay device having input and output terminals proximately positioned.

Still another object of the invention is to provide new and improved acoustic delay apparatus having a tank arranged to effect substantially twice the delay path ordinarily obtained for a given tank length.

Yet another object of the invention is to provide an acoustic delay means having an easily controllably stabilized delay interval.

Figure 2:
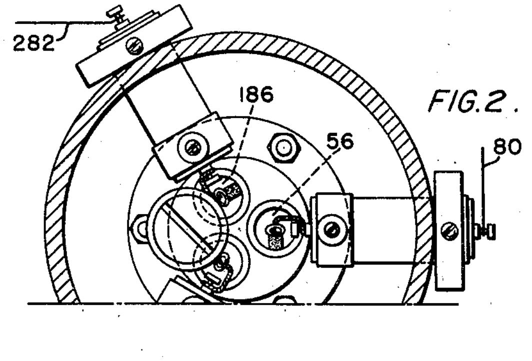
Figure 3:
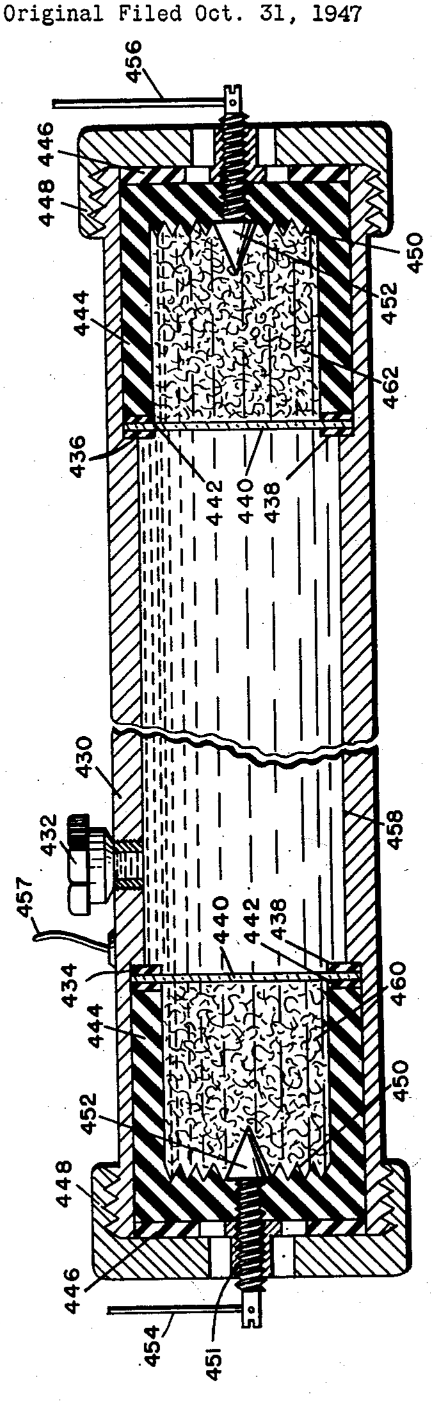
Figure 4:
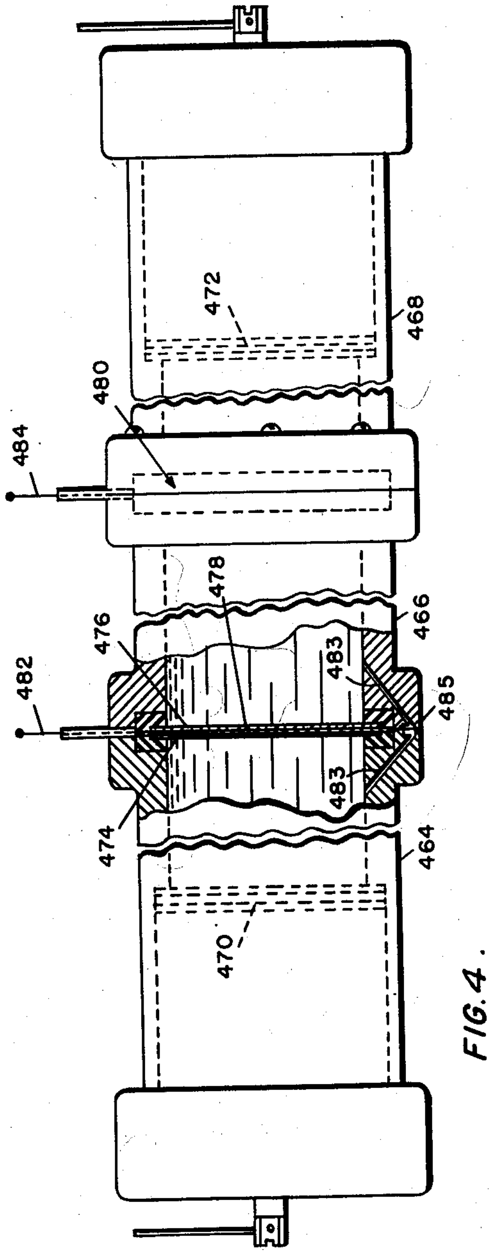
Figure 5:
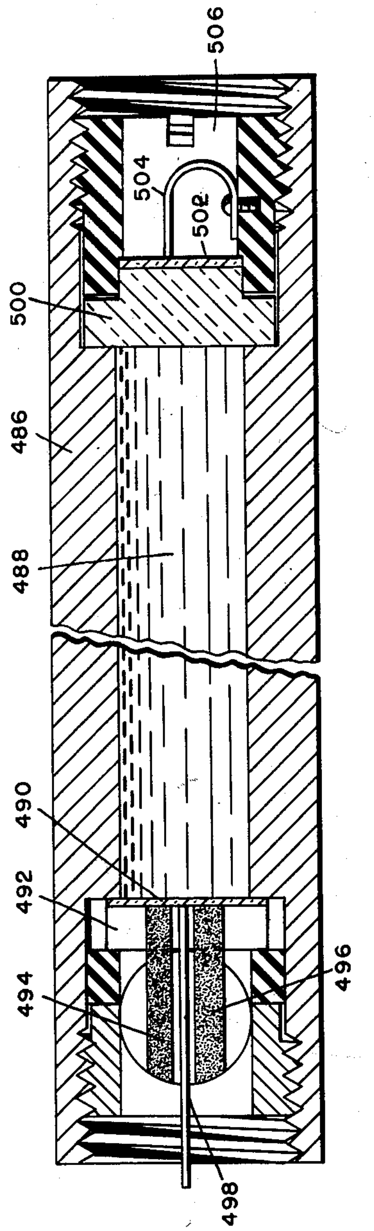

The above objects as well as other objects of the invention will become apparent from the following description read in conjunction with the accompanying drawings in which:

Figure 1 is an axial section through a preferred form of mercury tank involved in the recirculation of acoustic pulses, Figure 2 is a transverse radial section through the outer casing of the tank showing the upper ends of various elements of the tank, Figure 3 is an axial section taken through an alternative form of mercury tank, Figure 4 is an axial section taken through still another form of mercury tank particularly provided for the reading out of information at positions other than its terminals, and Figure 5 is an axial section of a further form of memory tank involving the reflection of pulses to secure an effective length of path equal to twice the length of a column of mercury.

The disclosure of a complete system within which this invention may be used will be found in the above-mentioned Patent No. 2,629,827, issued to John Presper Eckert, Jr., et al. on February 24, 1953.

An embodiment of an acoustic delay memory tank in accordance with the invention is illustrated in detail in Figures 1 and 2. The tank as illustrated is constructed to contain three pairs of crystals of which in the apparatus hereafter described only two pairs are used. The purpose of the third pair or other additional pairs will, however, become clear hereafter.

A tubular stainless steel cylinder 20 of suitable length is closed at its end by steel discs 22 and 24. Located outside these discs are end members 26 and 28. Associated with these end members are insulating discs 30 and 32 (having heat insulating rather than electrical insulating functions). The various parts just described are held together by bolts 34 on which are threaded nuts 36 and 38 arranged to clamp the elements together as illustrated in Figure 1 to provide mercury-tight closures at the ends of the tube 20. An opening 40 in the disc 22 has threaded therein an expansion tank 42 into which mercury 44 filling the tank 2 extends to provide a minimum gas pocket beneath a closure 46 for the expansion tank. Desirably air is excluded, either by reducing to a minimum any air pocket or by displacing it by an inert gas which will not oxidize the mercury. This may also be accomplished by providing an expandible bellows which will permit expansion of the mercury while excluding air. Openings 48 and 50 are arranged in pairs in the discs 22 and 24, and in line with these openings are quartz crystal assemblies consisting of ceramic carriers 52 and 54 mounting the crystals indicated at 56 and 58. In order to provide electrical conductivity to the outer faces of these crystals the ceramic carriers 52 and 54 are coated on the surfaces which carry the crystals with metallic silver which is continued upwardly in the form of strips as indicated at 60 under the metallic connectors 62 and 64 which are held on the ceramic carriers by screws. The quartz crystals 56 and 58 are soldered to the silver-coated inner surfaces of the carriers. As will be evident from Figure 1 the outer ends of the ceramic carriers terminate in flat bevel surfaces which have the function of preventing coherent acoustic waves from being reflected from the end surfaces back to the crystals.

The carriers are clamped in the assembly with the crystals against the portions of the discs 22 and 24 surrounding the openings 48 and 50 by means of threaded sleeves 66 bearing on intermediate annular insulating gaskets 68.

Special leads are provided to the crystal connectors 62 and 64 through the provision of tubes 70 and 72 of insulating material secured by screws to the tank assembly and serving to mount fine wires 74 and 76 which at their inner ends are connected to the connectors 62 and 64. External connections 80 and 82 to the wires 74 and 76, respectively, will be hereafter referred to.

In order to provide heat insulation for the mercury tank assembly the discs 30 and 32 are supported against shoulders 73 in the interior of an outer tube 71 which is closed by end caps 75. Suitable heat insulating material indicated at 77 fills the annular space between the mercury tank and the cylinder 71 and also the ends of the latter within the caps 75.

A heating coil 78 surrounds the mercury tank as indicated having its ends (not shown) extending outwardly through an opening in the tank 71.

While as will be evident hereafter compensation for temperature changes is provided by suitable electrical means it is nevertheless desirable that the mercury tank should be held as nearly as convenient to a constant temperature. It is for this reason that it is enclosed within the cylinder 71 with the provision of the insulating material 77. It is also for this reason that the leads 74 and 76 to the crystals are provided in the form of thin wires in the coaxial systems provided by the tubes 70 and 72 and their associated elements. The exterior surfaces of the tubes 70 and 72 are coated with metal such as silver in very thin layers while the wires 74 and 76 are quite fine. The result in that heat conduction along the electrically conductive paths is minimized.

While only one pair of crystals 56 and 58 is illustrated the tank as shown and as will be clear from Figure 2 contains two additional pairs of crystals, one pair consisting of the crystals 186 and 188 which will be hereafter referred to. The third pair of crystals are not shown as utilized in the present disclosure. It has been found that when a tank such as that illustrated is filled with mercury and if pairs of crystals are arranged opposite each other as shown, acoustic waves generated in the mercury by one of them are transmitted substantially as a cylindrical beam to the opposite crystal with rather little spreading or dispersion. Accordingly, pairs of crystals may be thus arranged in contact with a single body of mercury without the occurrence of cross-talk, i. e., the crystals of each pair cooperate substantially to the exclusion of effects on the adjacent pairs of crystls. While the tank illustrated is arranged to stand upright, it is sometimes more desirable to have the tank arranged for horizontal transmission of signals.

Satisfactory crystals for the purposes of transmission of acoustic waves through mercury may be 0.015 inch in thickness and highly polished at least on those sides which are in contact with the mercury. This latter condition is quite important since a roughly cut or unpolished crystal may result in entrapment of air at the mercury-crystal interface and then will not be nearly as effective for the piezo function of the crystal in this device. Quartz crystals for this purpose should be X-cut so that they will produce longitudinal acoustic, ultrasonic waves in the mercury when subjected to electrostatic potentials between their surfaces in the form of pulses. Piezo crystals other than quartz may be used, properly cut in fashions well known to the art for the best efficiency in producing longitudinal waves when a liquid transmission medium is used. However, when a solid medium is used, shear waves constitute the most efficient mode for transmission, these travelling slower than longitudinal waves. Crystals should then be suitably cut to produce shear waves to the substantial exclusion of longitudinal and transverse waves: for example, a BT-cut quartz crystal will produce almost pure shear waves in a solid medium such as glass.

While mercury is the desirable liquid used for reasons hereafter discussed, other liquids may be used for the transmission of the acoustic waves and in such cases the application of metal directly on the surface of the crystals by a plating process is desirable to provide proper conductivity to the crystal faces which may be in contact with an insulating liquid. However, owing to amalgamation of the ordinary plating metals with mercury, and since mercury is itself a conductor, it is desirable in the case of a mercury tank merely to provide a high polish on the crystal surfaces in contact with the mercury. The result is essentially the same as that secured by additional plating.

While in cases where the standardizing of the form of the pulse delivered from the memory device is effected on each orbital transmission of a pulse or its equivalent, the strict preservation of an ideal wave curve form in the mercury element may not be essential for the functioning of the resultant pulse taken out of the register, for other reasons or at other times it is desirable to effect such preservation of pulse rise, top, and drop characteristics of the standard pulse in the wave propagated in the mercury tank. For this purpose, a departure from conventional practice in the use of piezo-electric devices is made in this instance. As is known, under the influence of opposite potentials applied to plates at opposite sides of a piezo crystal oriented on a proper axis, the entire crystal becomes thickened or thinned, depending upon the polarity of the applied potential. This in our invention produces a movement of one face of the crystal against the mercury and the beginning of the propagation of a wave or pulse. Since the crystal has a finite thickness, the application of a potential in the form of a step function, in giving rise to a change of thickness at every point of the crystal, causes the production of an approximately linear rise of pressure in the mercury or other transmitting medium. The fall in the pressure following such rise is determined by both the characteristics of the crystal and of the tank. Some reflections from the crystal faces also appear. When, as here, pulses are to be transmitted at intervals of the order of one microsecond, more or less, these phenomena become material. They become manifest in lengthening of the pulse itself with interference or partial neutralizing of one pulse by another in transmission, by overlap and modification of rise time or of effective amplitude. When extremely closely spaced pulses are transmitted, it is necessary that they be of short length in relation to the time or space interval between discrete pulses in order that the potential of one may reach its zero value before another begins, and also in some cases so that intervening time may be available in which other devices may function in response to interspersed pulses of alternated timing. It is conceivable that a crystal might be of such thickness that response to a pulse having a duration of one quarter the period of pulse interval would produce a pulse or a length occupying all or more than the desired pulse interval. Consequently, in our invention, it is necessary that the thickness of the crystal be as nearly as practicable proportionate to a desired minimum duration of the pulse, when this is short, or to the interval between pulses, when this interval is short.

We have found that a quartz crystal response highly effective as compared to that of thicker crystals, may be obtained by reducing the thickness of the crystal to 0.015 inch with a good workable minimum of those effects which prevent sharp rises and falls of the transmitted pulses. In general the transit time for a wave across the crystal should be short relative to the wave period.

If connections are made across the face of the transmitting crystal 56 and an electrical source in a circuit giving rise to pulses, then on each pulse of the circuit, the crystal being nonconductive, a capacitive effect will be produced across the crystal accompanied by the expansion and contraction of the crystal as the potential rises or falls in the circuit, the crystals being properly cut and oriented in relation to the polarities applied. The abrupt response of the crystals to such pulses will propage corresponding acoustic waves in the mercury in contact with one side of the crystal. By means which will be explained hereafter, the crystal-actuating electrical pulses which we produce involve rise and fall characteristics such that a very abrupt rise and a very abrupt fall of potential or vice versa are produced within a very short time interval, say, one and one-half microseconds or less. There is ordinarily a tendency in the crystal due to its natural resonant period to produce echo or secondary wave forms, but such function is undesired here, and due to the very closely similar acoustical impedance value of the crystal and the mercury or other medium in contact with the crystal, this tendency of the crystal is suppressed so that, except for minor and unimportant oscillations, acoustic waves limited essentially to a single planiform advancing front of compression, with a single planiform following rarefaction are produced. Such a wave then graphically represented would have a nearly vertical front or rise, proportional to voltage applied, a flat top and a very sharp drop or fall at the back with no detrimental advance or following ripples, and an abscissa time value closely conforming to the duration of that electrical pulse across the crystal from which the acoustic wave originates.

At the same time as a pulse is produced in the mercury there will also be produced a pulse or wave leaving the crystal in the opposite direction and passing through the ceramic mounting. If this ceramic is chosen to have also substantially the acoustic impedance value of the crystal unwanted reflections are reduced to an insignificant value. The inertia of the backing of the crystal causes a wave propagated in the ceramic backing to equal in kinetic energy value that propagated in the mercury. This wave propagated in the ceramic, though reflected from the bevelled end of the support and thereafter multiply reflected within the support, will not enter the mercury, the angles of reflection preventing this. After a number of such reflections, the energy of this wave is dissipated. Thus there are eliminated any reflecting, resonating, or other interfering distinguishable acoustic pulses that would impair the distinctness of any succeeding wave propagated from the crystal through the mercury by reason of an electrical impulse acting across the crystal and very closely following the first transmitted pulse.

The wave transmitted longitudinally through the mercury acts upon the receiver crystal 58 with piezo effect, producing corresponding electrical response in the crystal. Between the faces, accordingly, there is manifested a difference of electrical potential which may be utilized for various purposes as hereafter indicated. The bevelled outer end of the ceramic support for the receiving crystal 58 reflects pulses which it receives and transmits them to the side of the ceramic support where such reflections are dissipated without being fed back into the mercury.

Aside from providing good acoustic impedance match to minimize reflections, the ceramic support has the function of mechanically supporting the fragile crystal to prevent accidental breakage.

The above-mentioned Patent No. 2,629,827 discloses a master oscillator and temperature control system. The purpose of this system is to provide the pulses for operation of the complete system with automatic control to avoid troubles due to temperature changes. Mercury tanks of the type heretofore described are such that the transmission times of pulses between the input and output are quite substantially affected by temperature to the end that, if a tank simultaneously contains a quite large number of digital pulse spaces, relatively small temperature changes may interfere with the emission of one pulse at the instant some other pulse spaced from the emitted pulse by a predetermined number is entering the tank. It may be here noted that the acoustic velocity in mercury decreases with rise of temperature. Insurance of proper operation results from the use of the temperature control system.

The mercury tank may contain a second pair of crystals similar to crystals 56 and 58 as heretofore indicated. The machining of the cylinder 20 to a uniform length throughout its circumference and the provision of parallel-face end plates 22 and 24 will insure identical spacing between each pair of crystals.

The fact that the second pair of crystals is in the same tank with the crystals 56 and 58 and provides transmission of pulses through the same body of mercury insures physical similarity with substantially identical temperature variations. However, if desired, two separate tanks may be provided, individual to the two sets of crystals, and so far as similar temperature variations are concerned these may be secured by having the tanks in close proximity to each other within, for example, a common insulated enclosure.

It may be here again remarked that the temperature is desirably maintained quite closely constant and for this purpose heat may be applied by current through the heating coil 78 under control of a thermostat responsive to temperatures within the enclosure. Such thermostatic control, however, forms no essential part of the present invention and need not be described in detail.

Referring to Figure 3 there is illustrated therein a mercury tank having certain structural features which, as will be evident, may be incorporated in a multiple tank of the type previously detailed.

The tank comprises a metal tube 430 provided with a filling opening 432 and with internal shoulders 434 and 436. Washers 438 of insulating material engage the shoulders 434 and 436 and in flatwise engagement with them are quartz crystals 440 of the type previously described. Washers 442 are provided outside these crystals and are engaged by the ends of insulating cups 444 which are pressed inwardly by the action on resilient washers 446 of screw caps 448 threaded on the ends of the tube 430. The internal bottoms of the cups 444 facing the outer faces of the crystals 440 are provided with annular serration 450 which provide, facing the crystals, angularly disposed walls which, as will be pointed out hereafter, tend to deflect disturbing reflections. Electrodes 452 having inwardly directed conical ends and threaded stems passing through the bottoms of the cups 444 and are secured thereto by nuts 451. Connections 454 and 456 are secured to these terminal electrodes. A connection 457 serves to provide electrical conduction to the tank 430 and the mercury between the crystals in the space 458.

The space 458 between the crystal faces is filled with mercury as are also the cavities 460 and 462 in the cuts 444. However, these cavities also preferably contain acoustically absorbent material such as glass wool or the like for the purpose of damping acoustic waves propagated from the outer faces of the crystals.

As described previously in connection with the crystals their faces are desirably highly polished to secure good acoustic transmission between the crystals and the mercury.

In the construction just described the portion of the tube 430 between the shoulders 434 and 436 constitutes a hollow tube containing mercury, continued by an end portion at each end of this tube carrying a piezo-electric crystal spaced by the washers 438 from the adjacent end of the tube. The cavities at 460 and 462 provided in each of these end portions open toward the central mercury tube and are closed by the faces of the crystals. The opposite wall of each cavity by reason of the serrations at 450 is angularly disposed with respect to the adjacent crystal face and contains mercury. The mercury in each of these cavities is insulated from the mercury between the crystals by the washers 438 and 442 pressed against the peripheries of the crystals. At each end of the line an electrical connection is made through the electrode 450 to the mercury in the cavity and the mercury in the hollow tube between the crystals is provided with an electrical contact at 457. As previously noted the mercury in the regions 458, 460 and 462 has an acoustic impedance substantially equal to the acoustic impedance of the piezo-electric crystals. The bodies of mercury furnish electrical contact with the crystal faces.

The fact that there is an impedance match between the crystals and the mercury insures a minimum of reflection of acoustic waves impinging on a crystal so that the receiving crystal, which may be either of those indicated, is substantially transparent to the acoustic waves which pass therethrough to be partially absorbed in the glass wool or other filler in the mercury in the end cavity while any residual waves reaching the ends of the cavity are reflected at such angles by the angularly disposed surfaces of the serrations 450 that they will be absorbed in the walls of the cavities without any substantial reflection back to the crystals. Accordingly, reflections are minimized. Furthermore, by reason of the impedance match between the crystals and the mercury the crystals will not continue to oscillate after the first impingement by a pulse, but rather any crystal oscillations will be quickly damped by reason of the free transmission of the energy to the mercury. The "Q" of the crystal is thus caused to be quite low.

While mercury is mentioned as the desired medium, it will be evident that liquids or substances other than mercury may be used which have similar acoustic impedances. In such cases, however, if the liquid is a non-conductor, electrical connections must be made to the crystal faces through thin metallic coatings thereon.

While quartz crystals are highly satisfactory, it will be evident that they may be replaced by other crystals such as those of Rochelle salt which may be carried by glass plates for the purpose of providing necessary mechanical strength. In such cases, of course, metallic coatings are provided for the purpose of securing electrical conductivity to the crystal faces.

If individual mercury or other tanks of the type just described or specifically illustrated are used, instead of providing a pair of acoustic delay lines in a single medium, the two tubes thus substituted for the single tank should be closely contiguous to each other and within a common enclosure, preferably heat insulated, so that they partake of the same thermal variations. This will insure that they will not become so different in temperature, as to disturb the proper uniform continuous operation of the system.

In certain instances it is desirable to transmit to external systems or devices pulses in transit in a delay line from one or more intermediate locations between its ends. Figure 4 illustrates a type of acoustic delay line in which this is possible. A tank is formed of a series of sections 464, 466, and 468 (there being more or less than the three illustrated), which sections are bolted together at their contiguous ends. Input and output crystals at 470 and 472 may be provided in any of the fashions previously indicated. In this instance, however, there are provided at the joints between the various tank sections transparent piezo-electric crystal arrangements which, while permitting free transmission of pulses from the input crystal to the output crystal, will serve to permit the taking off of electrical pulses during the passage of acoustic pulses. For this purpose, crystals 474 and 476 are cemented to opposite surfaces of metal foil indicated at 478 or are cemented to each other, adjacent faces of the crystals being coated with metal to provide conductivity. The outer faces of the crystals are, of course, in conductive contact with the bodies of mercury in the several chambers. External connections from the metallic electrode between the crystals are taken off as indicated at 482 and 484, the latter being from a crystal arrangement of 480 similar to that shown in section. For the purpose of preventing hydrostatic stresses the bodies of mercury in the various chambers are maintained in communication with each other through ducts 483 which communicate with chambers 485 formed in the flanges of the tank section.

The crystals may be of quartz or of other material of piezo-electric character having acoustic impedances as nearly as possible equal to that of mercury. Glass plates may be used for the mounting of quartz or Rochelle salt crystals with suitable metallic coating provided to form the electrodes for the crystals. When the acoustic impedance is matched the crystals with or without backing form a substantially integral part of the mercury body so that no material difference in transmission of acoustic pulses from the input to the output ends of the tank is perceptible as compared with a tank from which the intermediate take-off devices are absent. As the pulses pass the intermediate piezo crystal or crystals, however, electrical signals will be given off which may be used externally. The purpose of taking off signals intermediate the ends of the delay line is that there may be, in various instances, the desirability of securing a delay of take-off following the input to the line less than the transit time through the complete line. Sometimes it is desirable to take off simultaneously pulses in different memory spaces of the orbital circuit and this may be accomplished by the use of the tank just considered.

It may also be noted that, while pairs of crystals have been referred to at 474 and 476, one of them may be replaced by a support such as ceramic, glass or fused quartz which would be inactive from a piezo-electric standpoint. The support should, of course, be of a material forming a proper impedance match with the liquid used to prevent reflections which might become confused with the transmitted signals.

Figure 5 illustrates still another form of tank in which reflection of pulses is provided so that for a given physical tank length there may be secured a pulse path equal to twice this length. Furthermore, pulses may be taken off at the point of reflection. The tank in this case comprises a cylinder 486, the interior of which is filled with mercury or other liquid 488. A crystal 490 is cemented to a ceramic support 492 of the general type described in the first tank modification but in this instance the crystal essentially functions as two separate crystals by being provided on its outer cemented face with separate metallic coatings continued as indicated at 494 and 496 for the making of external connections. Between these connections there is desirably provided an electrostatic shield in the form of a metallic plate 498 which may be grounded and which is located between two separated portions of the support 492, these being cemented on opposite surfaces of the shield plate 498. At the opposite end of the tank a ceramic support 500 having the same acoustic impedance as mercury carries a crystal 502 coated on its surfaces with metal to provide electrical connections, the inner one of which may be grounded to the tank 486 while the outer one is connected through a wire 504 to a terminal mounted in the threaded clamping member 506. In the operation of this tank, assuming that the upper portion of the crystal 490 is used for transmission and the lower portion for reception, electrical signals are applied through the conductive coating 494 and give rise to acoustic pulses by reason of the piezo-electric effect of the crystal. These are transmitted through the mercury column and through the acoustically transparent support 500, being reflected by the outer surface of the crystal, which, in this case, is backed up by air having an acoustic impedance quite different from that of the crystal. The reflected pulses are retransmitted through the support 500 and the mercury column to the lower portion of the crystal 490, and through the piezo-electric effect, give rise to electrical signals which may be taken off from the conductive coating 496. The transducers constituted by the upper and lower portions of the crystal 490 are essentially isolated from each other except for the reflection path just described. Direct waves from one portion to the other through the mercury are avoided due to the characteristic of a liquid as acoustic medium for suppressing transverse modes of acoustic waves. Selection of the proper crystal cut assures that the crystal will be sensitive only for waves received along paths orthogonal to its face plane.

Besides giving a halfway read-out point and cutting the length of the mercury column in half for a given delay path this tank has the advantage of keeping input and output leads to associated electronic equipment short, thus simplifying design.

It will be obvious to those skilled in the art that the invention may find wide application with appropriate modification to meet the individual design circumstances, but without substantial departure from the essence of the invention.

What is claimed is:

1. In an acoustic delay device; a plurality of transducers each comprising an acoustic signal attenuating support having a crystal mounting surface non-parallel with its other bounding surfaces, a crystal having an exposed surface and an attaching surface, and an electrically conductive material between and adhering to said mounting surface of said support and the attaching surface of said crystal; a body having an enclosed chamber and retaining said transducers arranged in pairs having their exposed crystal surfaces opposite and parallel to each other; and a fluid within the chamber of said body directly engaging the exposed crystal surfaces of said transducers.

2. In an acoustic delay device; a plurality of transducers each comprising an acoustic signal attenuating support having a crystal mounting surface non-parallel with its other bounding surfaces, a crystal having an exposed and an attaching surface, and an electrically conductive material between and adhering to said mounting surface of said support and the attaching surface of said crystal; a cylindrical body having an enclosed chamber and retaining said transducers arranged in pairs having their exposed crystal surfaces opposite and parallel to each other; and a fluid within the chamber of said body and communicating with the exposed crystal surfaces of said transducers.

3. In an acoustic delay device; a plurality of transducers each comprising an acoustic signal attenuating support having a crystal mounting surface non-parallel with its other bounding surfaces, a crystal having an exposed and an attaching surface, and an electrically conductive material between and adhering to said mounting surface of said support and the attaching surface of said crystal; a cylindrical body having an enclosed chamber and comprising two ends walls substantially perpendicular to the cylindrical axis retaining said transducers arranged in pairs having their exposed crystal surfaces opposite and parallel to each other; and a fluid within the chamber of said body and communicating with the exposed crystal surfaces of said transducers.

4. In an acoustic delay device; a plurality of transducers each comprising an acoustic signal attenuating support having a crystal mounting surface non-parallel with its other bounding surfaces, a crystal having an exposed and an attaching surface, and an electrically conductive material between and adhering to said mounting surface of said support and the attaching surface of said crystal; a cylindrical tank having an enclosed chamber and comprising two end walls substantialy perpendicular to the cylindrical axis retaining said transducers arranged in pairs having their exposed crystal surfaces opposite and parallel to each other; and mercury fluid within the chamber of said tank and communicating with the exposed crystal surfaces of said transducers.

5. The combination according to claim 1 in which one transducer of each pair is an input transducer for transforming electrical signals into acoustic signals for propagation through said liquid, and the other transducer of each pair is an output transducer for transforming into electrical signals the acoustic signals propagated from its corresponding input transducer.

6. The combination according to claim 5 in which the input and output transducers of each pair have substantially the same acoustic path spacing to provide substantially the same transit time for each pair.

JOHN PRESPER ECKERT, JR.
JOHN W. MAUCHLY.

References Cited in the file of this patent

UNITED STATES PATENTS

| Number | Name | Date |
|---|---|---|
| 2,421,026 | Hall et al. | May 27, 1947 |
| 2,423,306 | Forbes et al. | July 1, 1947 |
| 2,431,862 | Carlin | Dec. 2, 1947 |
| 2,540,720 | Forbes et al. | Feb. 6, 1951 |